(12) United States Patent
Kitada

(10) Patent No.: US 6,407,781 B2
(45) Date of Patent: Jun. 18, 2002

(54) LCD DEVICE HAVING ELECTRONIC FORMED WITHIN CONCAVE PORTION OF A REFLECTOR

(75) Inventor: Takaaki Kitada, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/815,043

(22) Filed: Mar. 23, 2001

(30) Foreign Application Priority Data

Mar. 24, 2000 (JP) ........................................ 2000-083881

(51) Int. Cl.$^7$ ..................... G02F 1/1333; G02F 1/1335

(52) U.S. Cl. ........................... 349/58; 349/113; 349/65

(58) Field of Search ................................ 349/113, 149, 349/150, 58, 65

(56) References Cited

U.S. PATENT DOCUMENTS

| | | | |
|---|---|---|---|
| 5,694,190 A | * 12/1997 | Matsumoto et al. | 349/58 |
| 5,940,154 A | * 8/1999 | Ulkita et al. | 349/113 |
| 6,219,120 B1 | * 4/2001 | Sasaki et al. | 349/113 |
| 6,222,597 B1 | * 4/2001 | Muramatsu | 349/58 |

* cited by examiner

Primary Examiner—Toan Ton

(57) ABSTRACT

For reducing thickness of a liquid crystal display device in a depth direction thereof, the present invention provides a liquid crystal display device comprising a liquid crystal display device and a backlight unit disposed behind a liquid crystal display panel, wherein a reflector of the backlight unit has a wavy surface at rear side thereof, and a circuit board on which electronic components are disposed is fixed at the wavy rear surface of the reflector, so that the electronic components are located between the circuit board and a concave portion of the wavy rear surface of the reflecting plate.

3 Claims, 6 Drawing Sheets

LCD DEVICE HAVING ELECTRONIC FORMED WITHIN CONCAVE PORTION OF A REFLECTOR

BACKGROUND OF THE INVENTION

1. Field of the Invention

The present invention is related to a liquid crystal display device, particularly to a liquid crystal display device comprising a backlight unit called as i.e. direct type.

2. Description of the Related Art

As a size of a liquid crystal display panel becomes larger, a liquid crystal display device comprising a backlight unit having so-called direct-type structure becomes well-known.

This sort of the backlight unit is composed by housing a plurality of light source (e.g. cold cathode ray tubes) arranged to confront the liquid crystal display panel in a casing which also serves as a reflecting plate (a reflector).

On the other hand, the circuit board for driving the liquid crystal display panel is installed on a rear surface of the backlight unit.

SUMMARY OF THE INVENTION

However, in the liquid crystal display device composed in the aforementioned manner, the electronic components mounted on the circuit board is disposed on an opposite plane to the backlight unit, so that thickness of the liquid crystal display device is large in a depth direction thereof.

Moreover, since a cover for protecting the electronic components from external interference or obstacles needs to be furnished on the backlight unit, the structure of the backlight unit cannot but be complicated, and the thickness in the depth direction of the liquid crystal display device cannot but be larger.

The present invention is invented under these circumstances, and an object thereof is to provide a liquid crystal display device suitable to reduce the thickness in the depth direction thereof.

A summary of the representative one of the present invention disclosed in the specification for the present patent application will be concisely described as follows.

A liquid crystal display device according to the present invention comprises a liquid crystal display panel; a backlight unit being arranged at a back side of the liquid crystal panel (a rear side from a viewpoint of an observation side of the liquid crystal display panel); and a circuit board (e.g. a printed circuit board) being arranged at a back side of the backlight unit, and is characterized in that the backlight unit is constructed by a light source being arranged opposite to the liquid crystal display panel and a reflector reflecting light from the light source toward the liquid crystal display panel, the reflector has a concave surface at a part of a surface thereof opposite to the circuit board, and an electronic component is mounted opposite to the concave surface on the circuit board.

In the thus constructed liquid crystal display device, the circuit board provided so as not to increase thickness of the liquid crystal display device in a depth direction thereby.

Since the reflector of the backlight unit has a wavy structure (like a corrugated sheet, for instance) for guiding light from the light source to the predetermined direction, the above described structure utilizes a space between the concave surface appearing at a rear side (from the aforementioned viewpoint of the observation side of the liquid crystal display device) of the wavy structure and the circuit board (e.g. a printed circuit board) for housing the electronic components (e.g. for controlling operation of the liquid crystal display panel).

These and other objects, features and advantages of the present invention will become more apparent from the following description when taken in conjunction with the accompanying drawings.

DETAILED DESCRIPTION

An embodiment according to the present invention will be explained below with reference to drawings.

<<An Equivalent Circuit of the Liquid Crystal Display Device>>

Figure 2:
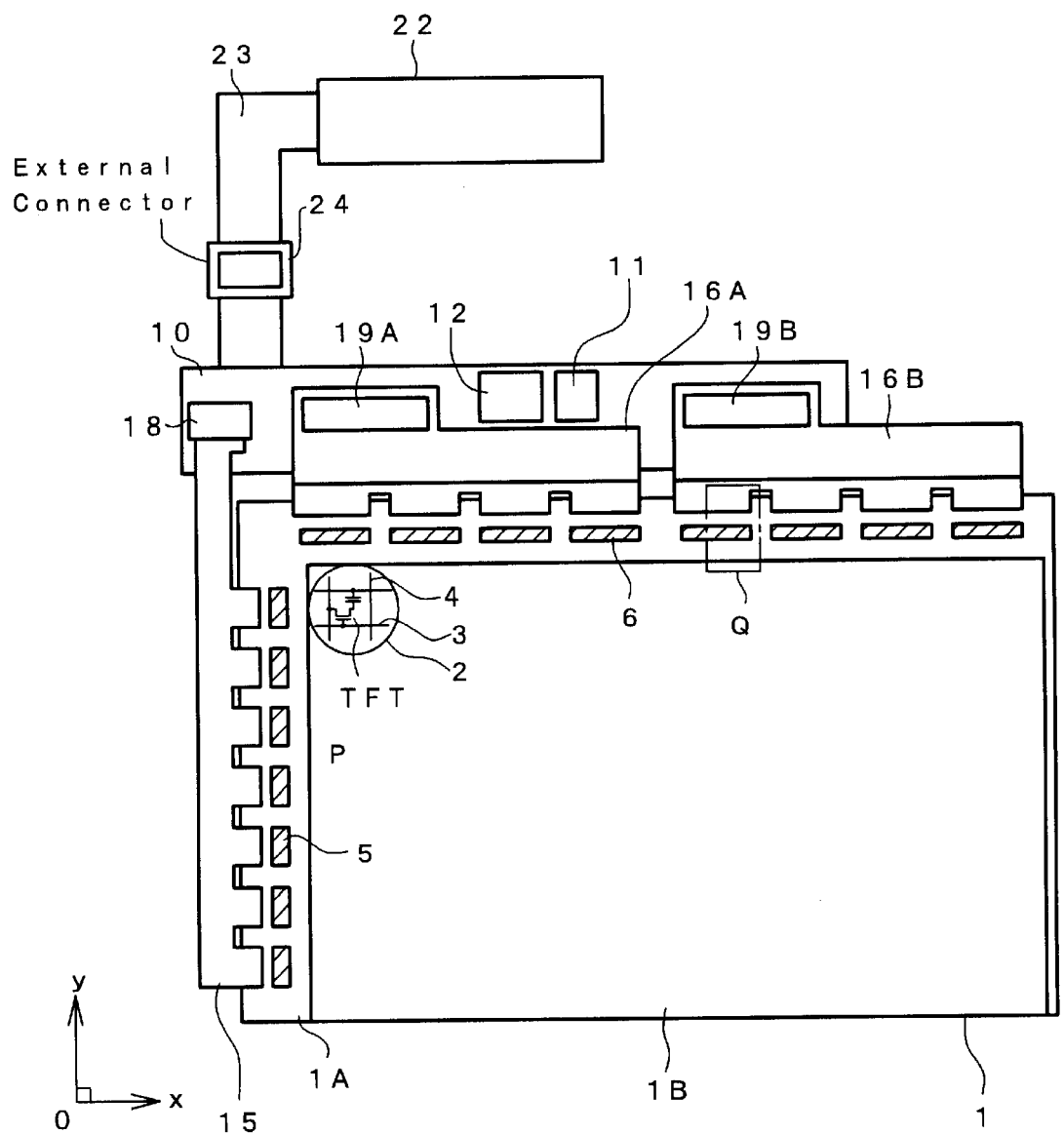
FIG. 2 is an equivalent circuit diagram showing one of embodiments of the liquid crystal display devices according to the present invention.

FIG. 2 is an equivalent circuit diagram showing one of embodiments of the liquid crystal display device according to the present invention. While FIG. 2 is a circuit diagram, however FIG. 2 is drawn in accordance with a practical geometrical arrangement of the liquid crystal display device.

In this embodiment, the present invention is applied to the liquid crystal display device employing a lateral electric field-scheme which is known as a liquid crystal display device having a wide viewing angle.

First of all, there is a liquid crystal display panel 1 having transparent substrates 1A, 1B which are arranged opposite to and spaced from one another by liquid crystals as a vessel thereof. In this case of the liquid crystal display device, one of the transparent substrate (the substrate at a lower side in FIG. 2: also called as a matrix substrate 1A) is formed to be slightly larger than another of the transparent substrate (the substrate at an upper side in FIG. 2: also called as a color filter substrate 1B), and these substrates are arranged so as to adjust peripheral edges of both of the substrates substantially to one another at lower and right sides in FIG. 2.

Thus, peripheries of the one of the transparent substrates 1A are extended outward from those of the another of the transparent substrates 1B at left and upper sides in FIG. 2. As further detail will be mentioned later, the portion of the one of the transparent substrates 1A jutting out from the another thereof 1B is utilized as an area on which gate driver circuits 5 and drain driver circuits 6 are mounted.

In a region where each of the transparent substrates 1A, 1B overlap one another, plurality of pixels 2 are formed to be arranged in a matrix manner. Each of the pixels 2 comprises a switching element TFT being formed in a area surrounding a pair of scanning signal lines 3 (being extended in a x-direction and juxtaposed in a y-direction in FIG. 2) and a pair of video signal lines 4 (being extended in the y-direction and juxtaposed in the x-direction in FIG. 2) and being operated by supplying a scanning signal through one of the pair of scanning signal lines 3, and a pixel electrode to which a video signal is applied from one of the pair of video signal lines 4 through the switching element TFT.

Since the liquid crystal display device of this embodiment employs the so-called lateral electric field-scheme as mentioned previously, each of the pixels 2 also comprises a counter electrode and an additional capacitance element other than the switching element TFT and the pixel electrode as further details thereof will be mentioned later.

One end of each of the scanning signal lines 3 (a left side end in FIG. 2) is extended to an outside of the transparent substrate 1B so that the one end is connected to an output terminal of a gate driver circuit (IC: Integrated Circuit) 5 being mounted on the transparent substrate 1A.

In this case, a plurality of the gate driver circuits 5 are provided on the substrate 1A, a plurality of the scanning signal lines 3 are grouped together by the gate driver circuit 5 arranged in the vicinity thereof, and the scanning signal lines 3 of each of the groups arranged adjacent to each other are connected to the gate driver circuit 5 corresponding to the group, respectively.

Moreover, one end of each of the video signal lines 4 (an upper side end in FIG. 2) is also extended to an outside of the transparent substrate 1B so that the one end is connected to an output terminal of a drain driver circuit (IC: Integrated Circuit) 6 being mounted on the transparent substrate 1A.

Also in this case, a plurality of the drain driver circuits 6 are provided on the substrate IA, a plurality of the video signal lines 4 are grouped together by the drain driver circuit 6 arranged in the vicinity thereof, and the video signal lines 6 of each of the groups arranged adjacent to each other are connected to the drain driver circuit 6 corresponding to the group, respectively.

On the other hand, a printed circuit board 10 is disposed in the vicinity of the liquid crystal display panel 1 on which the gate driving circuits 5 and the drain driving circuits 6 are mounted as mentioned above, and has a electric power source (supply) circuit 11 and control circuit (Integrated Circuit) 12 supplying input signals to the gate driving circuits 5 and the drain driving circuits 6 being mounted thereon.

The signals from the control circuit 12 are supplied to the gate driving circuits 5 and the drain driving circuits 6 via flexible printed circuit boards (a gate circuit board 15, a drain circuit board 16A, and another drain circuit board 16B).

Namely, the flexible printed circuit board (the gate circuit board 15) having terminals which confront and are connected to input side terminals of each of the gate driving circuits 5 is disposed at the gate driving circuits side of the liquid crystal display panel 1.

The gate circuit. board 15 is formed so that a portion thereof is extended to the aforementioned control circuit board 10, and is connected to the control circuit board 10 at the extended portion thereof via a connection portion 18.

Output signals of the control circuit 12 mounted on the control circuit board 10 are inputted to the gate driving circuits 5 via wiring layers on the control circuit board 10, the connection portion 18, and wiring layers on the gate circuit board 15, respectively.

On the other hand, the drain circuit boards 16A, 16B each of which has terminals confronting and being connected to input side terminals of each of the drain driving circuits 6 are disposed at the drain driving circuits side of the liquid crystal display panel 1.

The drain circuit boards 16A, 16B are formed so that each of the drain circuit boards has a portion being extended to the aforementioned control circuit board 10 side and is connected to the control circuit board 10 at the extended portion thereof via a connection portion 19A, 19B.

Output signals of the control circuit 12 mounted on the control circuit board 10 are inputted to the gate driving circuits 6 mounted on the drain circuit boards 16A,16B via wiring layers on the control circuit board 10, the connection portions 19A, 19B, and wiring layers on the drain circuit boards 16A, 16B, respectively.

Moreover, the flexible printed circuit board at the drain driving circuits side of the liquid crystal display device is divided into two, as denoted the drain circuit boards 16A, 16B, and disposed thereat. The flexible printed circuit board (the drain circuit board) is divided into two or more for e.g. preventing a thermal expansion thereof in a x-direction in FIG. 2 from affecting thereto (e.g. a deformation of the flexible printed circuit boards in the x-direction), as apparently as a length thereof in the x-direction increases in accordance with enlargement of the liquid crystal display panel size.

Each of outputs from the control circuit 12 on the control circuit board 10 is inputted to the gate driving circuit 6 corresponding thereto via a wiring layer on the control circuit board 10, the connection portion 19A of the drain circuit board 16A or the connection portion 19B of the drain circuit board 16B.

Furthermore, image signals are supplied from an image signal source 22 to the control substrate 10 via a cable 23 and an interface substrate 24, and inputted to the control circuit 12 mounted on the control substrate 10.

Incidentally, while the liquid crystal display panel 1, the gate circuit board 15, the drain circuit boards 16A, 16B, and the control substrate 10 are drawn to be located substantially on a same plane in FIG. 2, the control substrate 10 is arranged so that main surface thereof is almost perpendicular to that of the liquid crystal display panel 1 by bending the gate circuit board 15 and the drain circuit boards 16A, 16B.

By arranging the control circuit board 10 as mentioned above, an area of an i.e. picture frame of the liquid crystal display device is reduced. The picture frame in this explanation, is defined as a region between an outline of the liquid crystal display device and a contour of a display area thereof, and reducing this region provides an advantage that the display area thereof can be relatively larger in a plane surrounding the outline thereof.

<<Module of the Liquid Crystal Display Device>>

Figure 3:
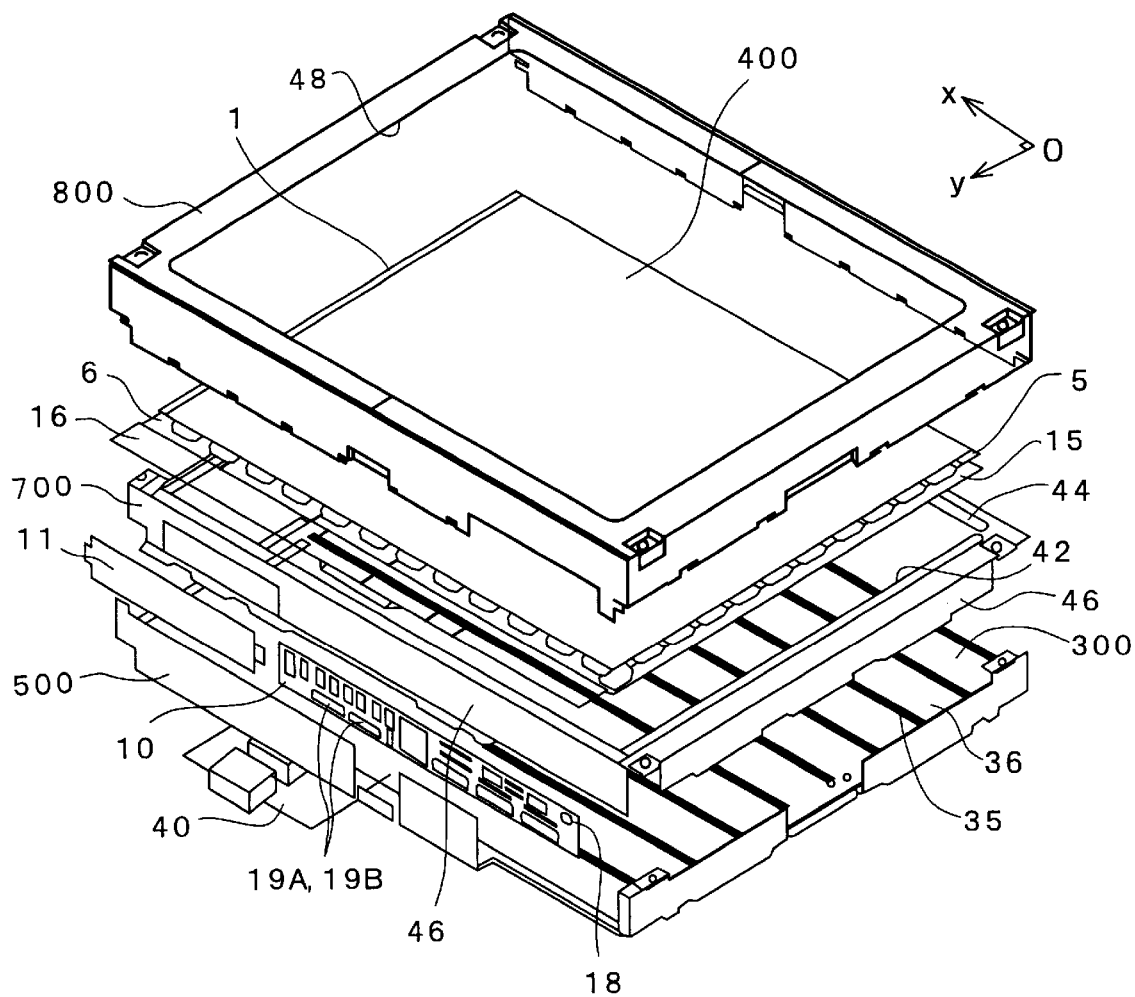
FIG. 3 is an exploded squint view showing one of embodiments of the liquid crystal display devices according to the present invention.

FIG. 3 is an exploded squint view of one of embodiments of modules of the liquid crystal display devices according to the present invention.

The liquid crystal display device in FIG. 3 comprises members which are classified roughly into a liquid crystal display panel module 400, a backlight unit 300, a resin frame member 500, a middle frame 700, and an upper frame 800 and assembled as modules, respectively.

Each of these members will be explained sequentially, hereinafter.

[Liquid Crystal Display Panel Module]

The liquid crystal display panel module comprises the liquid crystal display panel 1, the gate driving ICs (Integrated Circuits) 5 and the drain driving ICs 6 comprising a plurality of semiconductor ICs mounted on a periphery of the liquid crystal display panel 1, the flexible gate circuit board 15 and the flexible drain circuit boards 16 (16A, 16B, in FIG. 2) connected to each input terminal of these driving ICs.

Namely, outputs of the control substrate 10 going to be mentioned later are inputted to the gate driving ICs 5 and the drain driving ICs 6 on the liquid crystal display panel 100 through the gate circuit board 15 and the drain circuit boards 16A, 16B, and each output of these driving IC is inputted to the scanning signal line 3 or the video signal line 4 of the liquid crystal display panel 1.

Figure 4:
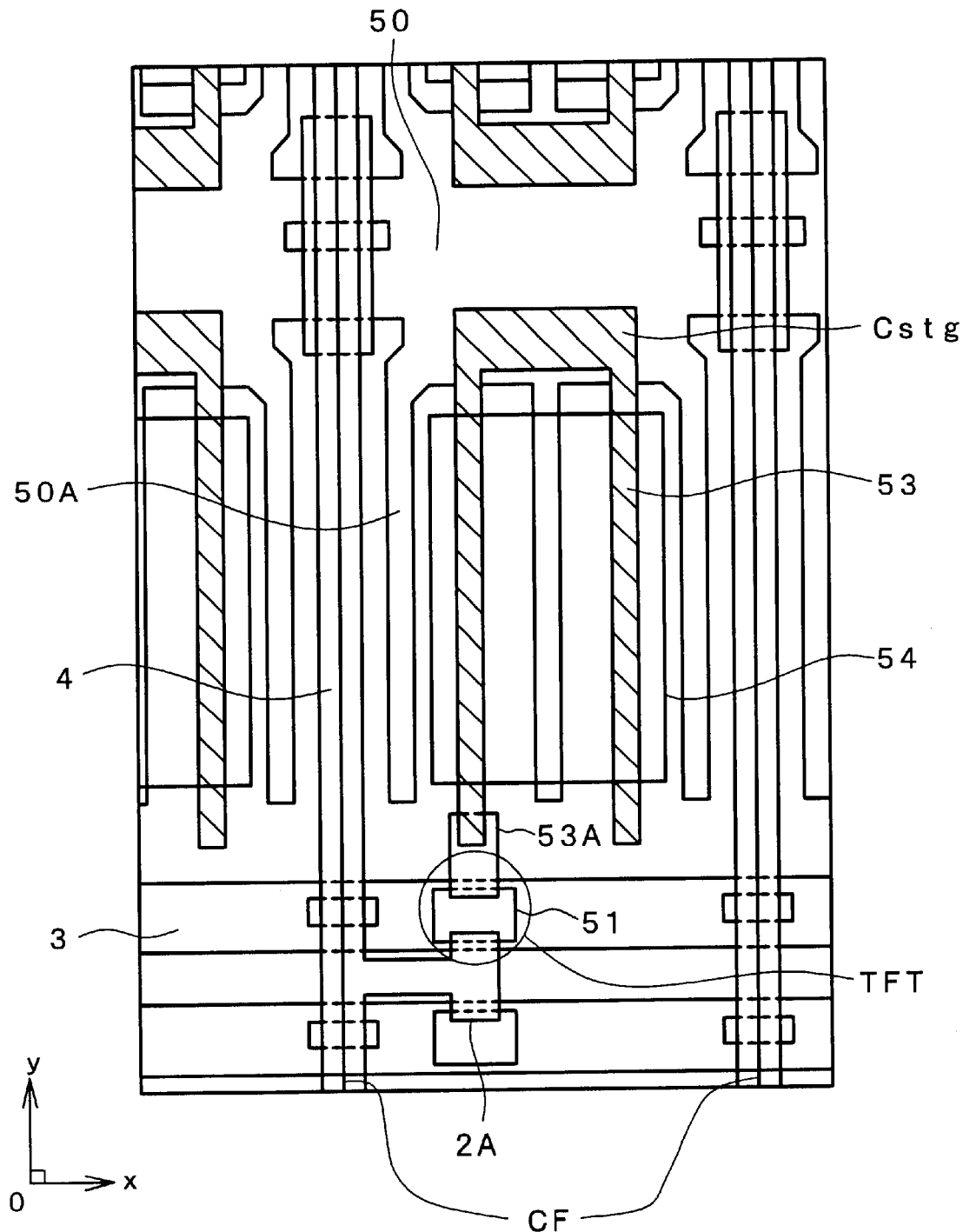
FIG. 4 is a plan view showing one of embodiments of pixels in the liquid crystal display devices according to the present invention.

Here, a display area of the liquid crystal display panel 1 comprises a plurality of pixels arranged in a matrix manner as mentioned above, and one of the pixels has a structure shown in FIG. 4.

In FIG. 4, the scanning signal line 3 and a counter voltage signal line 50 both extending in a x-direction are formed on a main surface of the matrix substrate 1A. A pixel region is formed as a region surrounded by these signal lines 3, 50 and the video signal lines 4 mentioned later.

Namely, the counter voltage signal line 50 is formed between a pair of the scanning signal lines 3 adjacent to one another (so as to be extended along the scanning signal lines 3), and the pixel regions are formed in respective regions spaced from one another by the counter voltage signal line 50 in +y and −y directions therefrom.

According to this arrangement, a number of the counter voltage signal lines 50 juxtaposed in the y-direction can be reduced almost to a half of that of conventional arrangement, an area occupied by the rest half of the counter voltage signal lines 50 according to the conventional arrangement can be utilized as the pixel regions, and areas of the pixel regions can be enlarged thereby.

In each of the pixel regions, counter electrodes 50A integrated with the counter voltage signal line 50 is formed for example so that three of the counter electrodes 50A are arranged in a same interval and extended in the y-direction. Each of these counter electrodes 50A is extended close to but not to be connected to the scanning signal line 3, two thereof arranged at both sides of the pixel region are arranged to be adjacent to the video signal line 4, and the rest one thereof is located at a center of the pixel region.

Furthermore, on the main surface of the transparent substrate 1A having the scanning signal lines 3, the counter voltage signal lines 50, and the counter electrodes 50A formed thereon as mentioned above, an insulating film formed of e.g. silicon nitride film covering even these scanning signal lines 3 etc. is formed. The insulating film functions as an interlayer insulating film for insulating the video signal lines 4 mentioned later from the scanning signal lines 3 and the counter voltage signal lines 50, as a gate insulating films for the thin film transistor TFT, and a dielectric film for storage capacitance Cstg, respectively.

First of all, semiconductor layers 51 are formed in a region provided for forming the thin film transistor on a surface of the insulating film. The semiconductor layer 51 is formed of e.g. amorphous silicon (Si) so that a portion thereof in the vicinity of a video signal line 2 mentioned later is overlapped with the video signal line 2 on the scanning signal line 3. Thereby, the scanning signal line 3 is constructed so that a part thereof serves as a gate electrode of the thin film transistor TFT, also.

Then, the video signal lines 2 being extended in the y-direction and juxtaposed in the x-direction are formed on the surface of the insulating film. The video signal line 2 is extended to a part of a surface of the semiconductor layer 51 as one of elements of the thin film transistor TFT, and united to a drain electrode 2A being formed on the semiconductor layer 51.

Moreover, a pixel electrode 53 being connected to a source electrode 53A of the thin film transistor TFT is formed on the surface of the insulating film in a pixel region. The pixel electrode 53 is formed to be extended in the y-direction at each center of respective pair of the counter electrode 50A. Namely, the pixel electrode 53 is extended in the y-direction from one of ends thereof serving as a source electrode of the thin film transistor TFT, then extended in the x-direction on the counter voltage signal line 50, and finally extended in the y-direction, so as to form U-shape thereby.

Here, a part of the pixel electrode 53 overlapping the counter voltage signal line 50 forms a storage capacitance Cstg together with the counter voltage signal line 50 and the insulating film as a dielectric film interposed there between. The storage capacitance takes effects, for instance, on storing video information in the pixel electrode 53 while the thin film transistor is turned off.

Furthermore, the surface of the semiconductor layer 51 corresponding to interfaces thereof contacting with the drain electrode 2A and the source electrode 53A is formed to be high impurity concentration layers by doping phosphorus (P), so as to provide ohmic contacts for each of the drain electrode 2A and the source electrode. In this case, the aforementioned structure is obtained by forming the aforementioned high impurity concentration layer at a whole region of the surface of the semiconductor layer 51 at first, then forming each of the electrodes on the high impurity concentration layer, and removing the high impurity concentration layer other than portions thereof formed at regions where the electrodes are formed by applying etching thereto using the electrodes as a mask.

Then, a protective film formed of e.g. silicon nitride ($SiN_x$) is privided on a upper surface of the insulating film where the thin film transistors TFT, the video signal lines 2, the pixel electrodes 53, and the storage capacitance Cstg are formed as mentioned previously, and an alignment film is provided on an upper surface of the protective film so as to construct a so-called lower substrate of the liquid crystal display panel 1.

Although FIG. 3 does not show a transparent substrate (a color filter substrate) 1B utilized as a so-called upper substrate of the liquid crystal display panel 1, a black matrix having openings each of which corresponds to the pixel region are provided at the liquid crystal side (the side facing the lower substrate) of the transparent substrate (a color filter substrate) 1B. A contour of each of the openings of the black matrix is denoted by a reference numeral 54 in FIG. 3.

Moreover, color filters are provided to cover the openings which are formed at respective portions of the black matrix 54 corresponding to the pixel regions. The color filter of one of the pixel regions has a different color from that of another of the pixel regions adjacent to the one of the pixel regions in the x-direction, and these two adjoining color filters form a boundary CF therebetween on the black matrix 54 (e.g. at a portion thereof opposite to the video signal line 2).

A leveling film of resin or the like is formed on a surface where the black matrix and the color filters are provided in the aforementioned manner, and an alignment film is formed on a surface of the leveling film.

[Backlight]

A backlight unit 300 is arranged at a rear surface of the liquid crystal display module 400.

Figure 5:
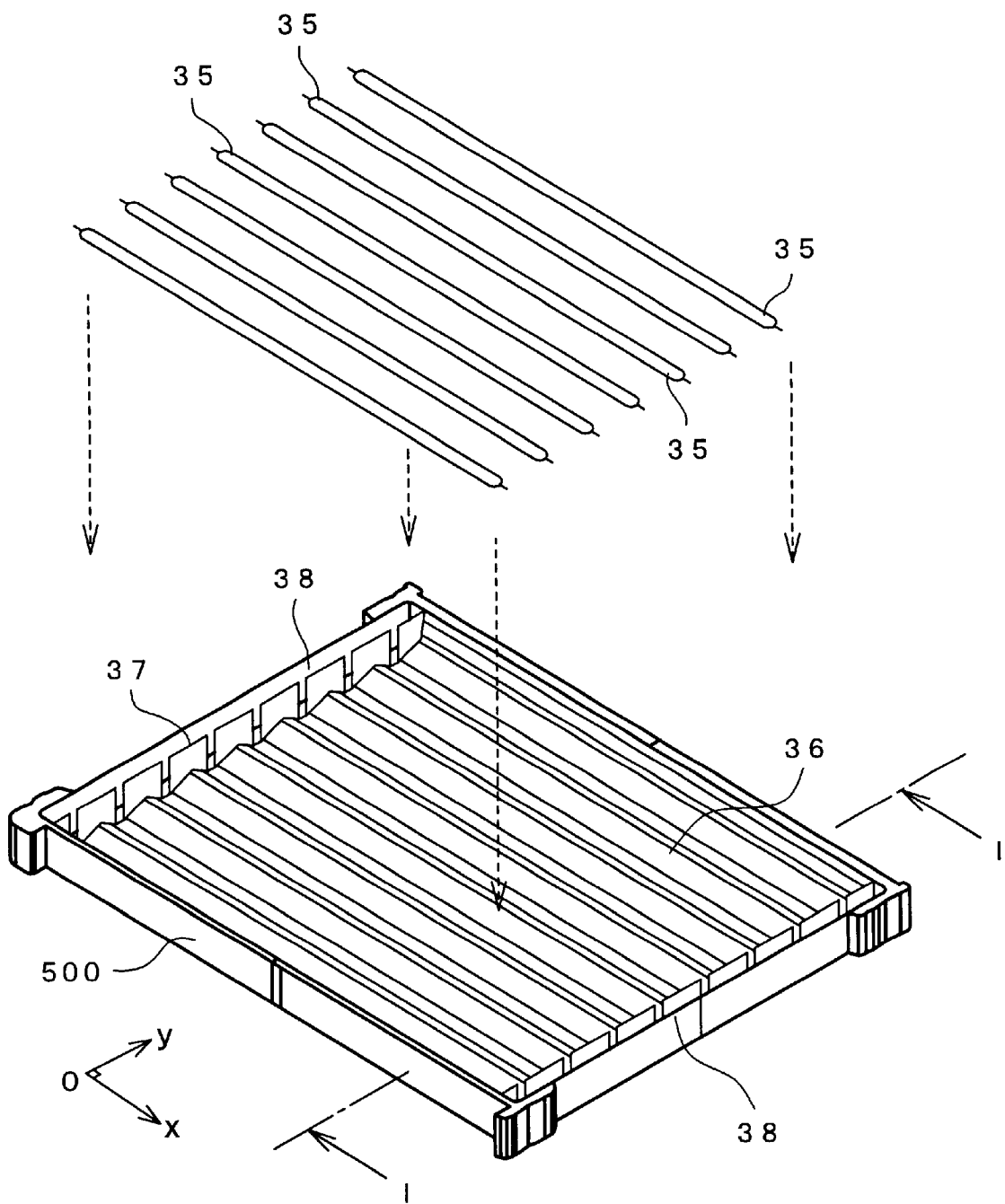
FIG. 5 is an exploded squint view showing one of embodiments of backlights in the liquid crystal display devices according to the present invention.

This kind of the backlight unit 300 is so-called direct backlight, and as shown in FIG. 5, comprises a plurality of linear light sources (e.g. cold cathode ray tubes) 35 extending in a x-direction in FIG. 5 and being juxtaposed in a y-direction therein at even intervals, and a reflecting plate (a reflector) 36 for irradiating the liquid crystal display panel module 400 with light from the cold cathode ray tubes 35.

The reflecting plate 36 is, for instance, wavy-shaped in a juxtaposing direction of the cold cathode ray tubes 35 (the y-direction). At a side of the exemplified reflecting plate 36 facing the cold cathode ray tubes, a concave portion shaped in an arc is formed at every part thereof where each of the cold cathode ray tubes 35 is disposed, and a convex portion shaped in an arc is formed at every other part thereof between the cold cathode ray tubes 35, respectively so as to irradiate the liquid crystal display panel module with light from each of the cold cathode ray tubes efficiently.

The reflecting plate 36 has "sides" (side walls) 37 provided at both sides thereof crossing each longitudinal direction of the cold cathode ray tubes 35 at right angles, and both ends of the respective cold cathode ray tubes 35 are inserted in slits 38 formed at the sides 37 respectively, so that movements of the cold cathode ray tubes 35 in a juxtaposed direction of the cold cathode ray tubes (the y-direction of FIG. 5) are controlled.

[Resin Frame Member]

A resin frame member 500 composes a part of an outer frame of the liquid crystal display device being assembled into a module, and houses the backlight unit 300.

The resin frame member 500 disclosed here has a box-shape having at least side wall, so that a diffusion plate (an optical diffusion plate, not shown) being arranged to cover the backlight unit 300 can be disposed on an upper end (an upper end surface) of the side wall.

The diffusion plate has a function to diffuse light from the each cold cathode ray tube 35 in the backlight unit, so that uniform light without any brightness unbalance can be radiated toward the liquid crystal display panel module 400.

While the resin frame member 500 is formed relatively small in thickness thereof, however mechanical strength reduction thereof is reinforced by the middle frame 700 (see in FIG. 3).

<<Control Substrate>>

Figure 1:
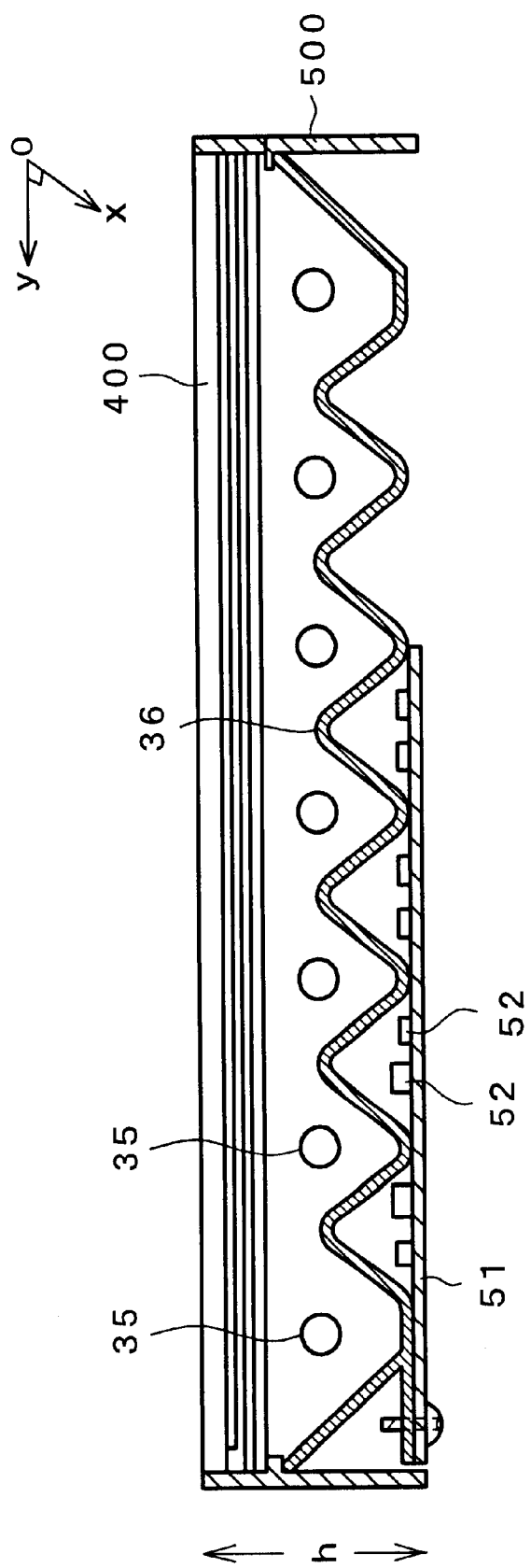
FIG. 1 is a cross sectional view showing one of embodiments of the liquid crystal display devices according to the present invention.

As FIG. 1 shows, a control substrate (a control board) 10 or a circuit board other than the control substrate is arranged at rear side (on a rear surface) of the reflection plate 36 composing the backlight unit 300. FIG. 1 is a cross sectional view taking along a I-I line in FIG. 1.

The control substrate 10 is connected to both the gate driving ICs 5 and the drain driving ICs 6 respectively mounted on the liquid crystal display panel via the gate circuit board 15 and the drain circuit board 16, as mentioned previously.

The control substrate 10 is constructed, for instance, by mounting electronic components 52 on a printed circuit board 51, the printed circuit board is fixed e.g. to the reflecting plate 36, and the electronic components 52 are mounted on a surface of the printed circuit board 52 at the reflecting plate 36 side.

Namely, the electronic components 52 are distributed to and disposed at belt-like regions extending in a x-direction in FIG. 1 and lining up in a y-direction therein on the printed circuit board 51, and the respective electronic components 52 are connected to wiring layers on the rear surface of the printed circuit board 51 (at an opposite side of the printed circuit board 51 to that for mounting the electronic components 52) via through holes for inputting a signal or electricity thereto or for outputting a signal or electricity therefrom. The through hole (not shown) is a conducting portion piercing through an insulating main body of the printed circuit board 51, and is utilized for connecting conductive layers provided at different layers from each other in (e.g. a front surface side and a rear surface side of) the printed circuit board 51.

The reflecting plate 36 has the wavy surface including both the concave portions and the convex portions being formed at a side thereof confronting the linear light sources 35. The wavy surface of the reflecting plate 36 should be provided as a corrugated sheet or the like manufactured by resin molding technique or press work technique applied to metal or alloy plate as shown in FIG. 1 in the view of weight reduction of or mechanical reinforcement of the backlight unit 300. When one of main surfaces of the reflecting plate 36 having the corrugated sheet structure at the linear light source 35 side is defined as "a front surface" and another of the main surfaces at opposite side to the front surface is defined as "a rear surface", the concave portion and the convex portion mentioned above being provided on the front surface of the reflecting plate 36 provide a convex portion and a concave portion on the rear surface of the reflecting plate, respectively. The aforementioned belt-like regions of the printed circuit board 51 having the respective electronic components mounted thereon confront the concave portions of the wavy rear surface of the reflecting plate 36, when the reflecting plate 36 is fixed to the rear surface of the reflecting plate 36. In other words, the belt-like regions are located so as to avoid the convex portions of the rear surface of the reflecting plate 36 (below the linear light sources 35, in FIG. 1).

Therefore, the printed circuit board 51 can be disposed at a rear side of the reflecting plate 36 to be contacted thereto (e.g. to convex portions on the rear surface thereof), while the respective electronic components 52 is housed in the concave portions of the rear surface of the reflecting plate 36 (in a space surrounded by the rear surface of the reflecting plate 36 and a front surface of printed circuit board 51).

As a size of the liquid crystal display device becomes larger, an area of the reflecting plate 36 becomes so large that more electronic components can be assembled on respective regions (respective ones of the aforementioned belt-like regions) which is provided by dividing a main surface (the aforementioned front surface) of the printed circuit board in accordance with the concave portion of the rear surface thereof.

Additionally, if the reflecting plate 36 is made of a conductive materials (e.g. metal), an insulation treatment may be applied to a surface (esp. the aforementioned rear surface) thereof for avoiding to be contacted directly with the electronic components 52.

Moreover, since no electronic component is disposed on another surface (the aforementioned rear surface) of the printed circuit board 51, a thickness h of the liquid crystal display device in a depth direction thereof can be reduced.

Furthermore, since any cover for keeping the electronic components from external interference or obstacles need not to be furnished at the side of the printed circuit board 51 where no electronic component is disposed, the thickness h of the liquid crystal display device in the depth direction thereof can be smaller.

In the aforementioned embodiment, a structure for installing the printed circuit board 51 directly to the reflecting plate 36 is applied to the backlight unit 300.

Figure 6:
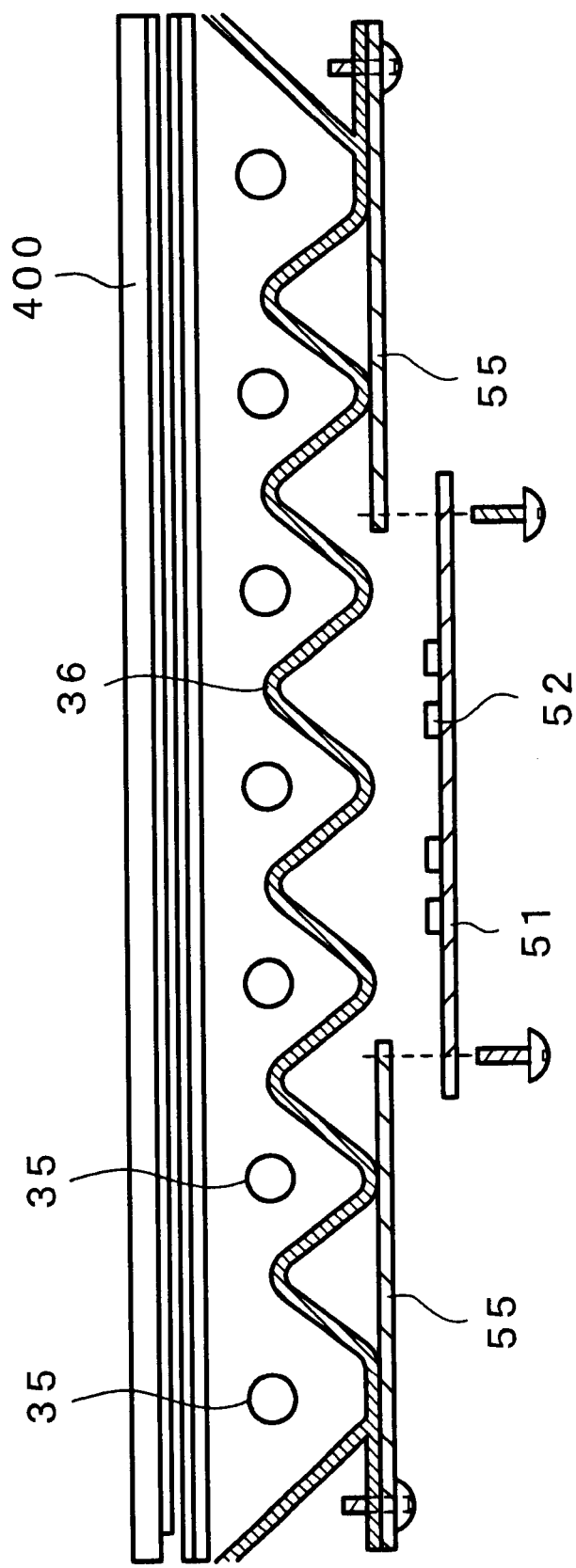
FIG. 6 is a plan view showing another of embodiments of the liquid crystal display devices according to the present invention.

However, it goes without saying that another board 55 for installing the printed circuit board 51 thereto may be installed to the reflecting plate 36 previously as FIG. 6 shows.

Of course, the board 55 used in this case, may be selected from a metal plate as well as an insulating plate.

In the aforementioned embodiment, the backlight unit 300 is assembled by installing the printed circuit board 51 to the reflecting plate 36. This sort of the backlight unit 300 structure takes an effect on locating the electronic components 52 on the printed circuit board 51 easily in accordance with the concave portions of the reflection plate 36. However, it goes without saying that the backlight unit may employ the other structure, for instance, having printed circuit board 51 installed to the resin frame member 500.

Furthermore, the aforementioned embodiment is explained on condition that no electronic components is mounted on a surface of the printed circuit board 51 opposite to the reflecting plate. However, the same effect as that of the backlight unit 300 of the aforementioned embodiment can be taken on the liquid crystal display device by classifying electronic components in accordance with sizes thereof (e.g. heights of the electronic components from a surface of the printed circuit board on which the electronic components are mounted), and by disposing some of the electronic components being large in height thereof, e.g. from the printed circuit board surface (or, in thickness thereof, also) at the reflection plate 36 side and by disposing the rest of the electronic components (being e.g. smaller in height from the printed circuit board surface or thinner than the formers) at another side to the reflection plate 36.

It is apparent by the previous explanation that the liquid crystal display device according to the present invention can reduce thickness thereof in a depth direction thereof.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:

a liquid crystal display panel;

a backlight unit being arranged at a back side of the liquid crystal pane 1; and a circuit board being arranged at a back side of the backlight unit, wherein the backlight unit is constructed by a light source being arranged opposite to the liquid crystal display panel and a reflector reflecting light from the light source toward the liquid crystal display panel, the reflector has a concave surface at a part of a surface thereof opposite to the circuit board, and an electronic component is mounted opposite to the concave surface on the circuit board.

2. A liquid crystal display device comprising:

a liquid crystal display panel, a backlight unit, and a circuit board being arranged in order from an observation side of the liquid crystal display device, wherein the backlight unit has a reflector having an uneven portion opposite to the liquid crystal display panel which waves in a certain direction, and an electronic component of the circuit board is located in a space between the circuit board and the reflector.

3. A liquid crystal display device comprising:

a liquid crystal display panel; and a circuit board is arranged behind a liquid crystal display panel being spaced therefrom by a backlight unit, wherein the backlight unit comprises a reflector being opposite to the liquid crystal display panel, and the circuit board is fixed to the reflector so that an electronic component being mounted thereon is housed in a concave portion provided at the reflector.

* * * * *